United States Patent
Yeon et al.

(10) Patent No.: US 10,176,932 B2
(45) Date of Patent: Jan. 8, 2019

(54) METHOD OF MANUFACTURING GRAPHENE COMPOSITE INCLUDING ULTRASONIC-WAVE PULVERIZATION POST-TREATMENT PROCESS AND METHOD OF MANUFACTURING ACTIVE MATERIAL USING THE SAME

(71) Applicant: Korea Institute of Energy Research, Daejeon (KR)

(72) Inventors: Sun-hwa Yeon, Sejong-si (KR); Myung-seok Jeon, Daejeon (KR); Kyoung-hee Shin, Daejeon (KR); Chang-soo Jin, Sejong-si (KR); Bum-suk Lee, Daejeon (KR); Se-Kook Park, Daejeon (KR); Dong-Ha Kim, Daejeon (KR); Sang Ho Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 246 days.

(21) Appl. No.: 15/237,950

(22) Filed: Aug. 16, 2016

(65) Prior Publication Data

US 2017/0053749 A1 Feb. 23, 2017

(30) Foreign Application Priority Data

Aug. 19, 2015 (KR) .................. 10-2015-0116908
Jul. 7, 2016 (KR) .................. 10-2016-0086201

(51) Int. Cl.
*H01G 11/34* (2013.01)
*C01B 31/04* (2006.01)
*H01G 11/86* (2013.01)
*C01B 32/23* (2017.01)

(52) U.S. Cl.
CPC .............. *H01G 11/34* (2013.01); *C01B 32/23* (2017.08); *H01G 11/86* (2013.01); *Y02E 60/13* (2013.01)

(58) Field of Classification Search
None
See application file for complete search history.

(56) References Cited

FOREIGN PATENT DOCUMENTS

| KR | 1020130079735 A | 7/2013 |
|---|---|---|
| KR | 10-2015-0015151 A | 2/2015 |
| KR | 10-2015-0021614 A | 3/2015 |

*Primary Examiner* — Kishor Mayekar
(74) *Attorney, Agent, or Firm* — Westman, Champlin & Koehler, P.A.; Amanda M. Prose (57) ABSTRACT

A method of manufacturing a graphene composite including an ultrasonic-wave pulverization post-treatment process. The method includes radiating a microwave on a mixture of graphite oxide and a conducting agent, dispersing a resultant material, obtained during the radiating the microwave, in a liquid and performing ultrasonic-wave pulverization, and freeze-drying particles subjected to the ultrasonic-wave pulverization. The post-treatment process is added to the method of manufacturing the graphene composite including the reduced graphene oxide using the graphite oxide, thereby manufacturing a graphene composite having improved bindability with spherical activated carbon used to manufacture an active material. Further, the post-treated graphene composite is used to manufacture the active material and the supercapacitor, and accordingly, the active material can be thinly and densely applied to provide a supercapacitor having improved performance.

8 Claims, 6 Drawing Sheets

METHOD OF MANUFACTURING GRAPHENE COMPOSITE INCLUDING ULTRASONIC-WAVE PULVERIZATION POST-TREATMENT PROCESS AND METHOD OF MANUFACTURING ACTIVE MATERIAL USING THE SAME

CROSS-REFERENCE TO RELATED APPLICATION

This application claims the priority benefit of Korean Patent Application No. 10-2015-0116908, filed on Aug. 19, 2015 and Korean Patent Application No. 10-2016-0086201, filed on Jul. 7, 2016 in the Korean Intellectual Property Office, the disclosure of which is incorporated herein by reference.

BACKGROUND OF THE INVENTION

1. Field of the Invention

The present invention relates to a method of manufacturing a graphene composite, and more particularly to a method of manufacturing a graphene composite that is suitable as an active material of a supercapacitor.

2. Description of the Related Art

Recently, the demand for supercapacitors, which are next-generation energy storage devices for replacing or supplementing lithium secondary batteries, has been rapidly increasing, and interest in supercapacitors has been growing. Accordingly, efforts have been continuously made to develop a 2D-structured graphene electrode having a large specific surface area and high electric conductivity.

A method of obtaining the reduced graphene oxide by oxidizing graphite, separating layers of graphite oxide in solution, and reducing the resultant graphene oxide has a merit in that graphene-based materials are obtained in a large amount.

Examples of subsequently developed related technologies include a method for stripping graphite oxide using a microwave technology (microwave radiation), and graphite having a particle size of about 150 μm is used as an initial starting material to manufacture graphite oxide.

In order to apply a microwave to the manufactured graphite oxide to thus manufacture the reduced graphene oxide (RGO), a conducting agent having high electric conductivity must be added. Conventionally, the conducting agent, such as super-P (registered trademark) and acetylene black, is added in an amount of about 10% for use thereof.

The conducting agent remains in the final material of the RGO manufactured using the aforementioned method, but the RGO is used without separation in most cases because it is difficult to separate the conducting agent. Further, an additional conducting agent is added to manufacture a slurry electrode using the RGO as the active material.

SUMMARY OF THE INVENTION

Accordingly, the present invention has been made keeping in mind the above problems occurring in the related art, and an object of the present invention is to provide a method of manufacturing a graphene composite to improve the efficiency of a supercapacitor.

In order to accomplish the above object, the present invention provides a method of manufacturing a graphene composite, including an ultrasonic-wave pulverization post-treatment process. The method includes radiating a microwave on a mixture of graphite oxide and a conducting agent, dispersing the resultant material, obtained during the radiation of the microwave, in a liquid and performing ultrasonic-wave pulverization, and freeze-drying the particles subjected to ultrasonic-wave pulverization.

The present invention developed a method of manufacturing reduced graphene oxide using a microwave, and relates to a method of manufacturing a graphene composite, the method further including pulverization and freeze-drying processes as a post-treatment process to thus improve the performance of a capacitor when the graphene composite is used as an active material. The reduced graphene oxide, the particles of which agglomerate due to radiation of the microwave, is subjected to ultrasonic-wave pulverization and freeze-drying. Thereby, the reduced graphene oxide particles having the uniform size are uniformly dispersed to improve the performance when the active material is manufactured using the reduced graphene oxide. This is because problems attributable to the structural differences of the conducting agent and the 2D-structured graphene oxide, used to synthesize the RGO and to manufacture the active material, are solved.

It is preferable that an ultrasonic wave having a frequency of more than 20 kHz be applied at power of 350 W or more for 1 hour or more during the ultrasonic-wave pulverization, and that the freeze-drying be performed at a temperature of −45° C. or less for 20 hours or more.

The graphite oxide is obtained by oxidizing graphite and, preferably, graphite powder is oxidized to obtain the graphite oxide. The size thereof is not particularly limited, but typical graphite powder having a particle diameter of ones of micrometers, another graphite powder, which is obtained by processing the typical graphite powder and which has a nanometer-sized particle diameter, which is smaller than the particle diameter of the typical graphite powder, or a combination thereof may be used. It is preferable that the conducting agent be at least one material selected from conductive carbon black and graphene oxide. The conductive carbon black may be one or more materials selected from super-P, acetylene black, and Ketjen black, but not limited thereto.

It is preferable that the radiating the microwave be performed at power of 600 W or more in an inert gas atmosphere for 50 sec or more.

A graphene composite according to another aspect of the present invention is manufactured using the aforementioned method.

The reduced graphene oxide, included in the graphene composite manufactured using the method of the present invention, is the same as the conventional reduced graphene oxide in view of material composition, but is different, when viewed on the microscopic scale, with respect to physical properties such as particle size, particle size distribution, and dispersibility. The reduced graphene oxide, included in the graphene composite of the present invention, differs from the conventional reduced graphene oxide in view of particle size, particle size distribution, and dispersibility, but there is no means for describing the different graphene composites having the aforementioned differences therebetween. Accordingly, the aforementioned differences are described using the difference in the manufacturing method in the present specification.

In order to accomplish the above object, the present invention also provides a method of manufacturing an active material for a supercapacitor. The method includes radiating a microwave on a mixture of graphite oxide and a conducting agent, dispersing a resultant material, obtained during the radiating the microwave, in a liquid and performing ultrasonic-wave pulverization, freeze-drying particles, subjected to ultrasonic-wave pulverization, to form a graphene composite, and mixing the formed graphene composite and an activated carbon for the active material.

It is preferable to use a spherical activated carbon as the activated carbon for the active material. Specifically, it is preferable to use the AC0830 activated carbon.

An active material according to another aspect of the present invention is manufactured using the aforementioned method.

The active material, manufactured using the method of the present invention, differs from the conventional active material in view of the properties of the active material due to the physical properties of the reduced graphene oxide included in the graphene composite used in the active material. However, since there is no means for describing the aforementioned difference, the aforementioned difference is described using the difference in the manufacturing method in the present specification.

In order to accomplish the above object, the present invention also provides a method of manufacturing a supercapacitor. The method includes preparing an anode current collector and a cathode current collector, attaching an active material to the surfaces of the anode current collector and the cathode current collector, and packaging the anode current collector and the cathode current collector, to which the active material is attached, a separator separating an anode and a cathode, and an electrolyte. The active material is manufactured using the aforementioned method of manufacturing the active material.

A supercapacitor according to another aspect of the present invention is manufactured using the aforementioned manufacturing method. The supercapacitor of the present invention differs from the conventional supercapacitor in view of electrochemical properties, such as storage capacity, due to differences in the manufacture of the graphene composite including the reduced graphene oxide used in the active material. However, since there is no means for describing the aforementioned difference, the aforementioned difference is described using the difference in the manufacturing method in the present specification.

According to the present invention having the aforementioned constitution, a post-treatment process is added to the method of manufacturing a graphene composite including the reduced graphene oxide using graphite oxide, thereby manufacturing a graphene composite having improved bindability with activated carbon used to manufacture an active material.

Further, the post-treated graphene composite is used to manufacture the active material and the supercapacitor, and accordingly, the active material is thinly and densely applied in order to realize a supercapacitor having improved performance.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

A detailed description will be given of an Example of the present invention, with reference to the appended drawings.

Synthesis of Graphite Oxide (GO)

3 g of graphite, 360 ml of $H_2SO_4$, and 40 ml of $H_3PO_4$ were mixed and then agitated for 30 min. Subsequently, cooling was performed in an ice bath for about 10 min, and 18 g of $KMnO_4$ was slowly added, followed by agitation for 30 min. The agitated sample was reacted at 55° C. for 24 hours. Typical graphite powder available on the market was used as the graphite in the present Example without separate post-processing, and the average particle diameter of the powder was about 4 μm.

In order to remove an excessive amount of $KMnO_4$ from the sample after the reaction was finished, 3 to 18 ml of $H_2O_2$ was added little by little until the color of the sample changes to yellow.

In addition, 100 ml of HCl, 100 ml of ethanol, and 100 ml of $H_2O$ were mixed and agitated for 1 hour. The mixture solution was added to the sample subjected to the aforementioned procedure and agitated for 1 hour.

The resultant solution was washed using distilled water until the pH was 5 or more, and was then dried to obtain GO powder.

Generation of Graphene Composite Including Reduced Graphene Oxide (RGO)

The synthesized GO powder and super-P, which was a conducting agent, were mixed at a ratio of 9:1 and added to a 1000 ml beaker. The atmosphere inside the beaker was replaced with Ar using a glove box.

Subsequently, a microwave of 700 W was radiated for 1 min in an inert gas atmosphere in the glove box to reduce the GO powder. From the change in the color of the sample from yellow to black, it could be seen that stripping was performed. In order to further remove functional groups remaining after the reduction process, a microwave of 100 W was radiated for about 6 mm to generate a graphene composite. In the graphene composite, the RGO, which was the final product, and super-P, which was the conducting agent, were mixed with each other. Hereinafter, the graphene composite means a complex material manufactured by radiating a microwave. The complex material includes the RGO and a material used as the conducting agent. In the present Example, super-P was used as the conducting agent for use in the manufacture of the RGO, without being limited thereto.

Post-Treatment Process of Graphene Composite 3 g of the graphene composite, including the RGO, generated using radiation of the microwave according to the aforementioned procedure was dispersed in 800 ml of distilled water to constitute a colloidal solution. An ultrasonic wave was applied to the colloidal solution to perform a pulverization process. The ultrasonic-wave pulverization process was performed at a power of 410 W using a pulverization device with a frequency of 40 kHz for 2 hours.

After the ultrasonic-wave pulverization process, the colloidal solution was subjected to centrifugation at a speed of 9000 rpm for 10 min to be separated into a supernatant solution and a precipitate. The supernatant solution was removed, and the precipitate was obtained and dried using a freeze-drying process. The freeze-drying process was performed at $-55°$ C. for 24 hours.

Figure 1:
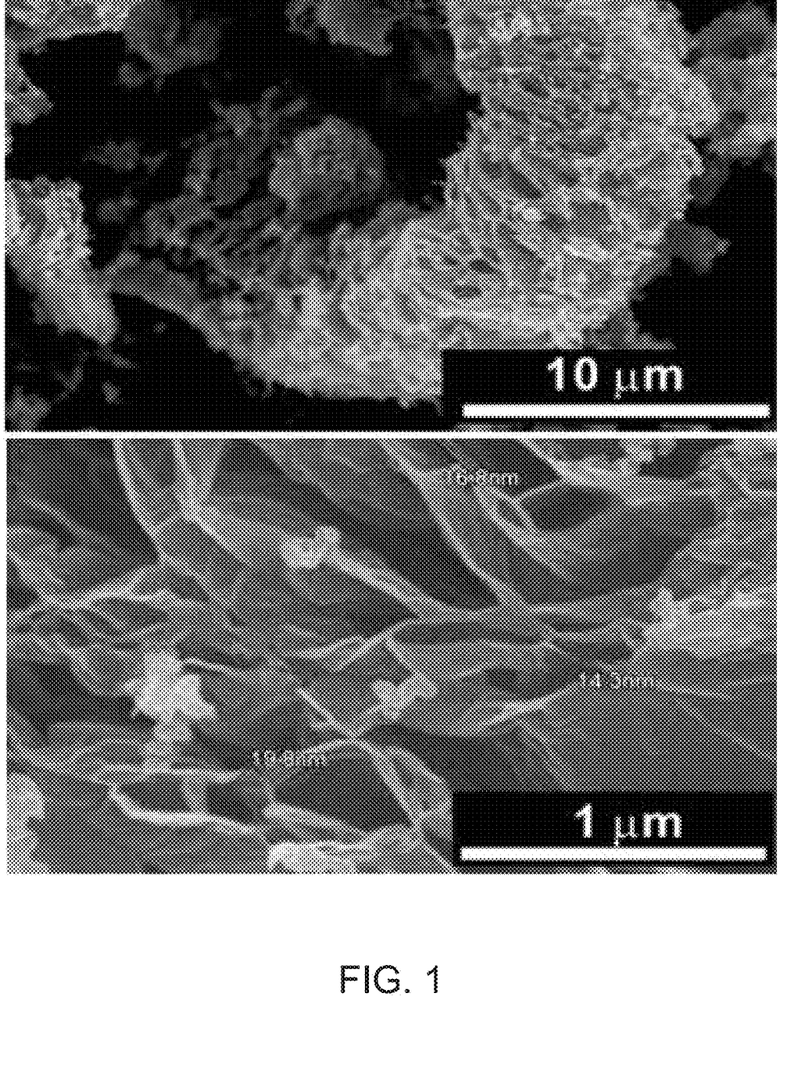
FIG. 1 is an electron microscopic picture obtained by photographing a sample of a graphene composite, which includes RGO, not post-treated according to the present Example.
Figure 2:
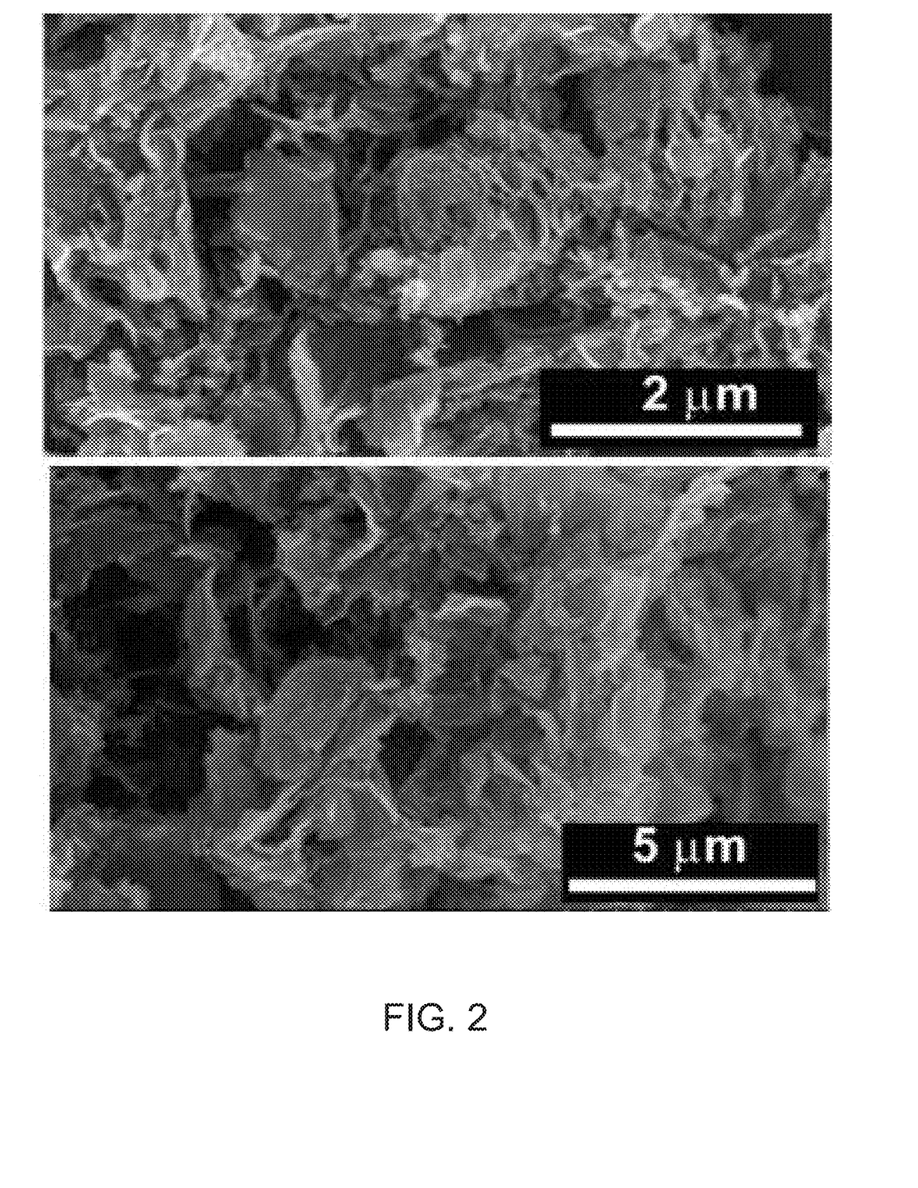
FIG. 2 is an electron microscopic picture obtained by photographing the sample of the graphene composite, which includes the RGO and has undergone an ultrasonic-wave pulverization process of the post-treatment processes according to the present Example.
Figure 3:
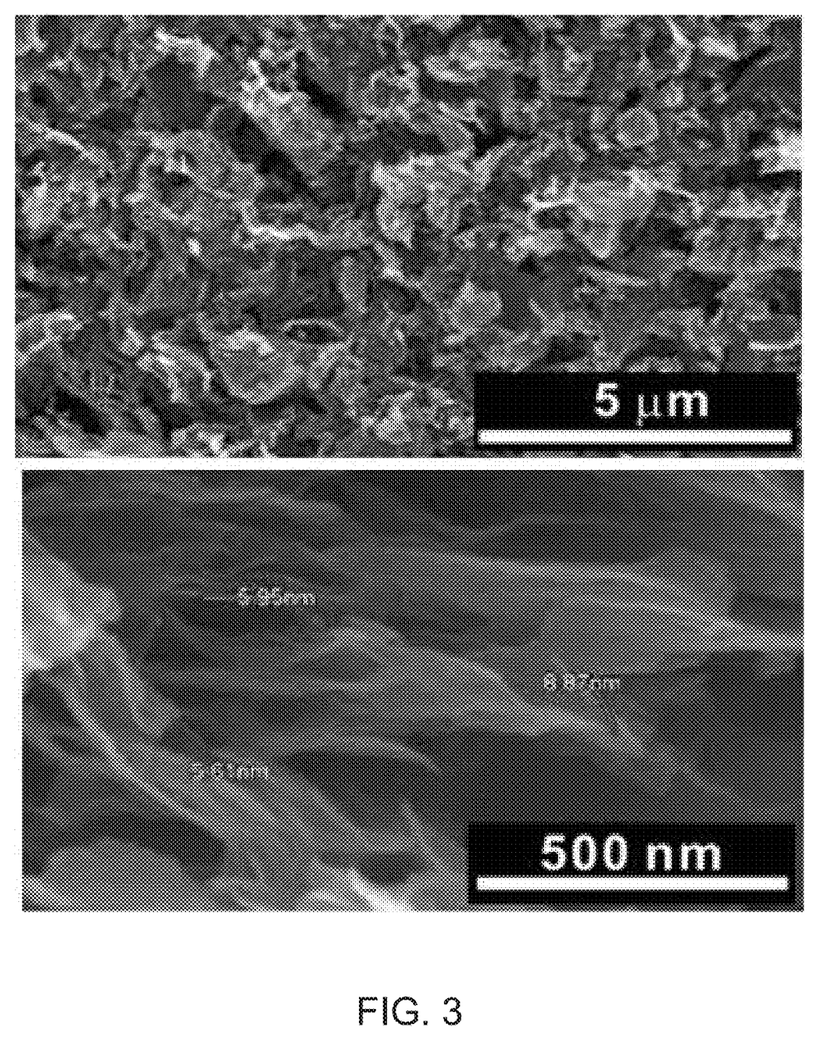
FIG. 3 is an electron microscopic picture obtained by photographing the sample of the graphene composite, which includes the RGO and has undergone a freeze-drying process and the preceding processes, according to the present Example.

FIG. 1 is an electron microscopic picture obtained by photographing the sample of the graphene composite, which includes RGO, not post-treated according to the present Example, FIG. 2 is an electron microscopic picture obtained by photographing the sample of the graphene composite, which includes RGO and undergoes the ultrasonic-wave pulverization process of the post-treatment processes, according to the present Example, and FIG. 3 is an electron microscopic picture obtained by photographing the sample of the graphene composite, which includes RGO and undergoes the freeze-drying process and the preceding processes, according to the present Example.

From the drawings, it could be confirmed that the RGO included in the graphene composite that was not post-treated was agglomerated and had a large particle size, but that the particle size of the RGO was reduced when the ultrasonic-wave pulverization process, among the post-treatment processes, was performed, and that the RGO particles were uniformly spread when the freeze-drying process was performed.

In FIG. 1, the RGO particles form layers each having a thickness of 14 to 20 nm and the layers agglomerate to form a honeycomb having a size of about 10 μm. However, from FIG. 3, it can be seen that the RGO fragments are present with a size of 1 to 2 μm and that a layer thickness is 5 to 9 nm, indicating a narrower particle size distribution, a smaller layer thickness, and uniform dispersion of the RGO particles.

Manufacturing of Active Material Composite

The active material was manufactured using the post-treated graphene composite including the RGO.

AC0830 spherical activated carbon was prepared in order to manufacture the active material. The AC0830 activated carbon and the graphene composite including the RGO were mixed to manufacture the active material. Specifically, the graphene composite including the RGO and the activated carbon were prepared at a weight ratio of 1:1 and mixed in a mortar.

The active material manufactured using the AC0830 activated carbon is represented by AC-RGO below.

Figure 4:
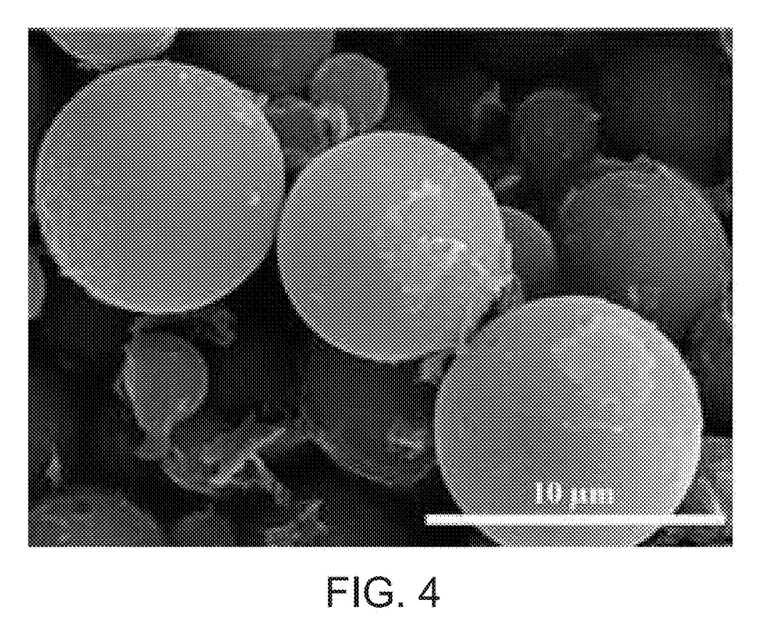
FIG. 4 is an electron microscopic picture obtained by photographing the AC0830 activated carbon used in the present Example.
Figure 5:
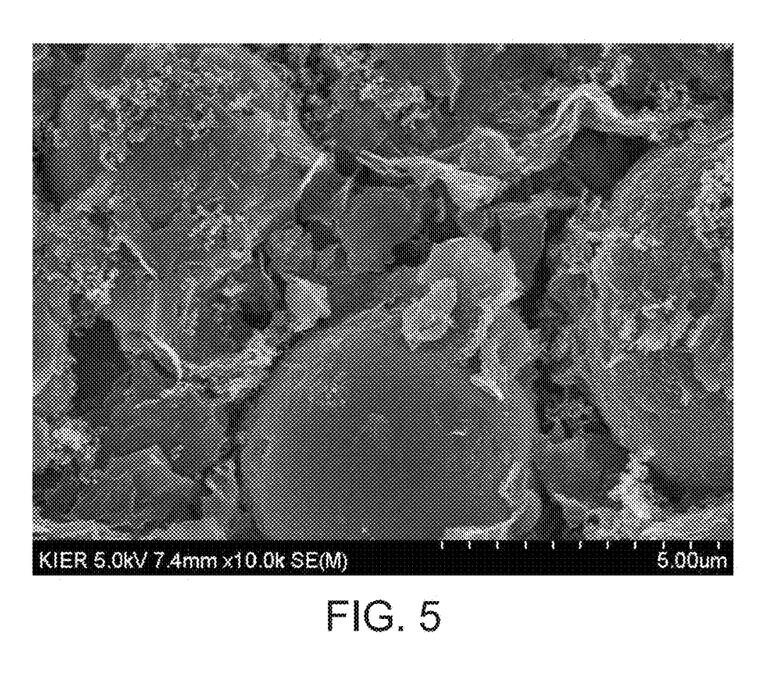
FIGS. 5 to 7 are electron microscopic pictures obtained by photographing the AC-RGO active material manufactured in the present Example.
Figure 6:
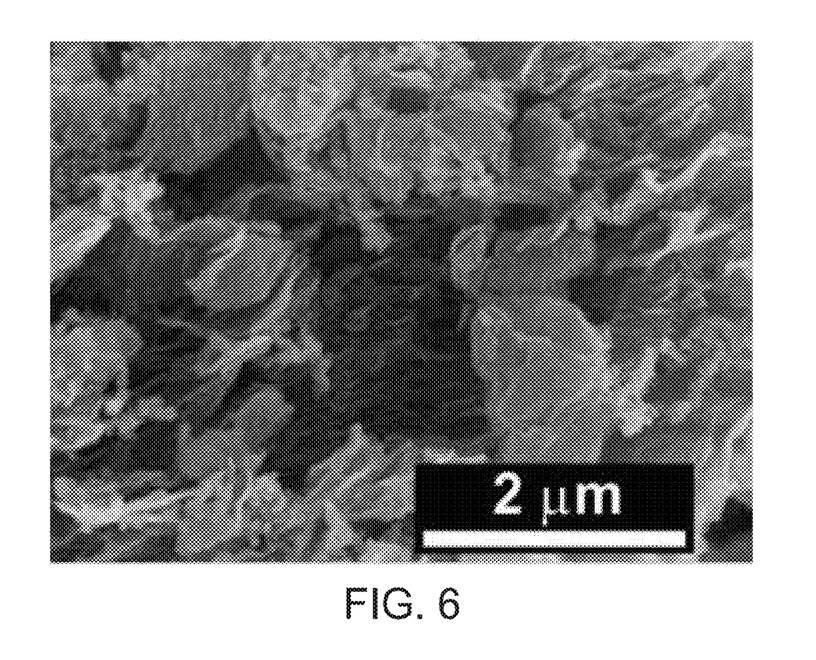
Figure 7:
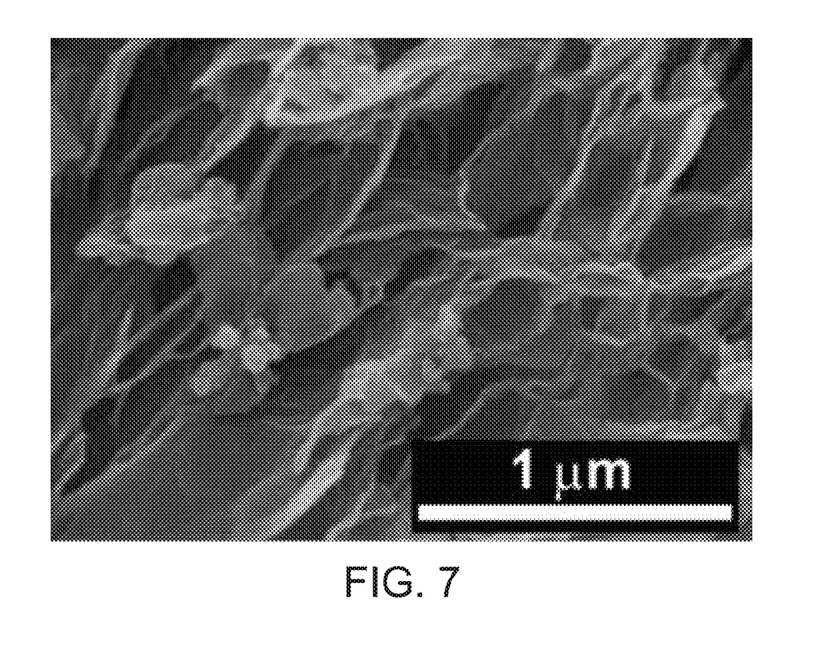

FIG. 4 is an electron microscopic picture obtained by photographing the AC0830 activated carbon used in the present Example, and FIGS. 5 to 7 are electron microscopic pictures obtained by photographing the AC-RGO active material manufactured in the present Example.

From the drawings, it can be confirmed that the post-treated graphene composite particles including the RGO according to the present Example are small and uniformly dispersed, and that the graphene composite particles are mixed with the AC0830 activated carbon to uniformly mix the activated carbon and the RGO. Further, from the increase in uniformity of the RGO particles, it can be confirmed that adhesion between the activated carbon and the RGO is improved.

Accordingly, when the activated carbon and the RGO are uniformly mixed and adhesion therebetween is increased, the active material may be more thinly applied on a current collector under the condition that the same amount is applied, and the active material may be included in a larger amount under the condition that the same thickness is achieved. Further, since the adhesion between the activated carbon and the RGO is excellent, it is expected that the electrode is stabilized and conductivity is increased to thus improve storage performance.

Measurement of Electrochemical Properties

The manufactured active material, super-P, and polyvinylidene fluoride (PVDF) were mixed at a ratio of 8:1:1 to be applied on a piece of aluminum foil having a thickness of 30 μm and then dried in a vacuum oven at a temperature of 120° C. for 12 hours, thereby manufacturing a coin cell (2032 kit).

Figure 8:
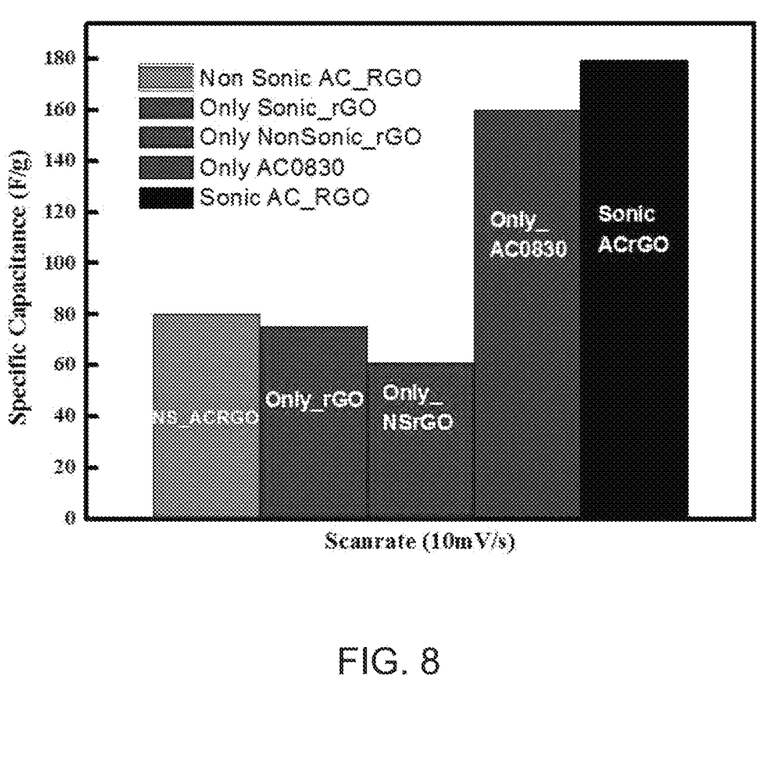
FIG. 8 shows the result obtained by measuring the capacitances of the active material of the present Example and the active material of a Comparative Example.

FIG. 8 shows the result obtained by measuring the specific capacitances of the active material of the present Example and the active material of the Comparative Example.

The active material (Sonic AC_RGO) manufactured in the present Example is represented by "Sonic ACrGO (Sonic)", and the remainders are provided as comparative examples.

Specifically, the active material (Only Sonic-rGO), which included the graphene oxide subjected to ultrasonic-wave pulverization as post-treatment but which did not constitute the active material composite, was represented by "Only_rGO". The active material (Non Sonic AC-RGO) including the AC0830 activated carbon and the graphene oxide, which was not subjected to ultrasonic-wave pulverization as post-treatment, to constitute the active material composite was represented by "NS_ACRGO". The active material represented by "Only_NSrGO" was the active material (Only NonSonic_rGO) which was not post-treated and which included only the graphene oxide while not constituting the oxide complex.

As shown in the drawings, all of the active materials of the Comparative Example exhibited a specific capacitance that was lower than that of the active material (Only AC0830) including only the AC0830 activated carbon. However, the active material manufactured in the present Example exhibited specific capacitance that was improved compared to the active material including only the AC0830 activated carbon.

This means that the active material of the present invention exhibits excellent specific capacitance based on a combination of two characteristics of the post-treatment process of the reduced graphene oxide and the constitution of the active material composite including the spherical activated carbon for the active material. Meanwhile, the improvement in the active material of the present invention is achieved via an effect obtained from the post-treatment process of the graphene oxide, an effect obtained from the constitution of the active material composite including the activated carbon for the active material, and a combined effect thereof, and the result is better than expected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a graphene composite, including an ultrasonic-wave pulverization post-treatment process, the method comprising:
   radiating with a microwave, a mixture of graphite oxide and a conducting agent in powder form, resulting in a reduced graphite oxide material;
   dispersing the resulting reduced graphite oxide material in a liquid to form a colloidal solution;
   pulverizing particles in the colloidal solution using an ultrasonic-wave; and
   freeze-drying the pulverized particles.

2. The method of claim 1, wherein the ultrasonic wave is applied at a power of 350 W or more for 1 hour or more during the ultrasonic-wave pulverization.

3. The method of claim 1, wherein the freeze-drying is performed at a temperature of −45° C. or less for 20 hours or more.

4. The method of claim 1, wherein a graphite powder is oxidized to obtain the graphite oxide.

5. The method of claim 1, wherein the conducting agent is at least one material selected from conductive carbon black and graphene oxide.

6. The method of claim 1, wherein the radiating the microwave is performed at power of 600 W or more in an inert gas atmosphere for 50 sec or more.

7. A method of manufacturing an active material for a supercapacitor, the method comprising:
   radiating with a microwave, a mixture of graphite oxide and a conducting agent in powder form, resulting in a graphite oxide material;
   dispersing the material resulting graphite oxide material, in a liquid to form a colloidal solution;
   pulverizing particles in the colloidal solution with an ultrasonic-wave;
   freeze-drying the pulverized particles to form a graphene composite; and
   mixing the formed graphene composite and an activated carbon, forming the active material for the supercapacitor.

8. The method of claim 7, wherein the activated carbon for the active material is spherical.

* * * * *

UNITED STATES PATENT AND TRADEMARK OFFICE
CERTIFICATE OF CORRECTION

| | |
|---|---|
| PATENT NO. | : 10,176,932 B2 |
| APPLICATION NO. | : 15/237950 |
| DATED | : January 8, 2019 |
| INVENTOR(S) | : Sun-hwa Yeon et al. |

Page 1 of 1

It is certified that error appears in the above-identified patent and that said Letters Patent is hereby corrected as shown below:

In the Claims

In Column 8:
In Claim 7, at Line 6, delete the first occurrence of "material" following "dispersing the"

Signed and Sealed this
Eleventh Day of June, 2019

Andrei Iancu
*Director of the United States Patent and Trademark Office*